United States Patent [15] 3,675,952
Mears [45] July 11, 1972

[54] ADJUSTABLE DROP NIPPLE FOR PENDENT SPRINKLER

[72] Inventor: James W. Mears, Warwick, R.I.
[73] Assignee: Grinnell Corporation, Providence, R.I.
[22] Filed: July 24, 1970
[21] Appl. No.: 57,915

[52] U.S. Cl. ...........................285/302, 151/19 R, 151/25 B, 169/41, 285/307
[51] Int. Cl. .........................................................F16l 15/02
[58] Field of Search..................285/307, 302, 298, 113, 177; 287/53 L, 53 K, 83, 114; 151/19 R, 25 B; 169/37, 38, 39, 41

[56] References Cited

UNITED STATES PATENTS

| | | | |
|---|---|---|---|
| 3,451,483 | 6/1969 | Van Houtte et al. | 285/302 X |
| 3,529,671 | 9/1970 | Adams | 169/41 |
| 2,770,475 | 11/1956 | Rafferty | 285/354 X |
| 50,896 | 11/1865 | Bowden | 285/307 X |
| 2,478,127 | 8/1949 | Parker | 285/113 X |
| 3,494,639 | 2/1970 | Smith | 285/113 |

FOREIGN PATENTS OR APPLICATIONS 2,003,736  11/1969  France....................................285/113

*Primary Examiner*—Dave W. Arola
*Attorney*—H. Edward Foerch

[57] ABSTRACT

An adjustable drop nipple is disclosed for connecting a pendent sprinkler to a sprinkler system. The nipple includes outer and inner telescoped pipes with a gripping means therebetween which permits an adjustment of the telescoped relation of the pipes for a desired position of the pendent sprinkler below a drop ceiling. The gripping means includes rollers which are positioned in an annular cavity having a downwardly reducing cross-sectional area and which have spiral threads on their outer cylindrical surfaces. When the nipple is installed in its pendent position, the rollers restrain downward movement of the inner pipe, that is a lengthening of the nipple, by a jamming action of the rollers in the reduced cross-sectional area portion of the annular cavity; but the spiral threads on the rollers permit spiral downward movement of the inner pipe for a lengthening of the nipple. The rollers ride upwardly in the cavity to release their grip and thereby permit a shortening of the nipple toward a more telescoped position responsive to an upward force on the inner pipe.

21 Claims, 7 Drawing Figures

INVENTOR
JAMES W. MEARS
BY H. Edward Foerch
ATTORNEY

INVENTOR
JAMES W. MEARS
BY
H. Edward Fouch
ATTORNEY

ADJUSTABLE DROP NIPPLE FOR PENDENT SPRINKLER

BRIEF SUMMARY OF THE INVENTION

In well-known fire protection sprinkler systems, distribution piping for the fire protection fluid is positioned at times between a room ceiling and a drop ceiling. Nipples extend downwardly from the distribution piping and sprinklers which are designed to operate in a pendent position are installed in the lower ends of the nipples. The length of each drop nipple must be such as to locate the sprinkler at desired position relative to the drop ceiling. This length is not uniform for all drop nipples and it cannot be determined as a practical matter before the drop ceiling is installed.

On the other hand, during the erection of a building having a drop ceiling, the sprinkler system is customarily installed and pressure-tested before the drop ceiling is hung. Thus, it is necessary to install the drop nipples to complete the sprinkler system for the test, without knowing how long to make the drop nipples.

In practice, one approach is to install nipples having approximately the desired length, and then to adjust the length of the nipples after the drop ceiling is installed either by cutting a nipple shorter and rethreading it if a nipple is too long, or by replacing the nipple with a new one having the desired length if the original nipple is too short.

Alternatively, an adjustable nipple is used which permits adjustment of its length to a desired length after the drop ceiling is constructed. An adjustable nipple must be capable of axial adjustment, both upwardly and downwardly; it must hold the sprinkler in the adjusted position without slipping and without leaking for the life of the sprinkler system, and it must cost less to install and to adjust then the cost of shortening one-piece nipples which are too long or of replacing one-piece nipples which are too short as originally installed.

An object of the present invention is to provide an improved adjustable nipple for connecting a pendent fire sprinkler to a sprinkler distribution system, which is relatively inexpensive to construct, which permits axial adjustment of its length in either direction by a simple operation requiring very little time to perform, no special tools, and which holds its desired length reliably and without leaking throughout the life of the sprinkler system.

Another object is to provide an adjustable drop nipple for connecting a pendent fire sprinkler to a sprinkler system which, when the nipple is installed, automatically restrains an axial lengthening thereof, but which permits a lengthening of said nipple by a spiral motion.

Another object is to provide an adjustable drop nipple having means which, when the nipple is installed, restrains an axial lengthening of the drop nipple, but which causes no resistance to an axial shortening of the drop nipple.

In particular, my adjustable nipple comprises a first pipe having an end which is threaded for connection to a sprinkler piping system and a second, smaller pipe having an end which is threaded to receive a sprinkler. The other end of the smaller pipe is telescoped into the other end of the larger pipe.

A reducer fitting assembly, or gripping means, is threadedly connected to the other end of the larger pipe and comprises preferably a standard reducer fitting body which is threaded in its larger opening and which is provided with an annular groove on the inner surface of its smaller opening. An O-ring, or other seal, is positioned in the groove and provides a fluid seal with the surface of the inner, telescoped pipe.

Because the inner surface of a standard reducer fitting body is curved or converges toward its smaller end, the annular cavity formed between such inner surface and the circumferential surface of the inner, telescoped pipe decreases in cross-sectional area axially thereof from the larger to the smaller end of the cavity.

Rollers having spiral ridges on their outer cylindrical surfaces are positioned loosely in the cavity between the inner surface of the fitting and the outer surface of the telescoped inner section of the nipple. Spacing of the rollers around the annular space is maintained by a retainer means.

With the nipple connected in a pendent position, the weight of the rollers keeps them in the narrow, or lower, portion of the annular cavity. Axial movement of the inner pipe in a downward direction causes the rollers to jam in the narrow, lower portion of the cavity, that is, between the inner surface of the reducer body and the outer surface of the inner pipe, thereby gripping these surfaces and preventing further axial movement downwardly of the inner pipe. However, since the ridges or threads are formed with the same spiral direction on all rollers, the inner telescoped pipe may be lowered along a spiral path by rotating the inner pipe relative to the outer pipe and coupling. An upward force on the inner pipe causes the rollers to move upwardly in the cavity and to release their grip thereby permitting the inner pipe to be moved upward to shorten the nipple.

The best modes in which I have contemplated applying the principles of the present invention are shown in the accompanying drawings but these are to be deemed primarily illustrative for it is intended that the claims shall cover by suitable expression in the appended claims whatever of patentable subject matter resides in the invention disclosed.

Figure 1:
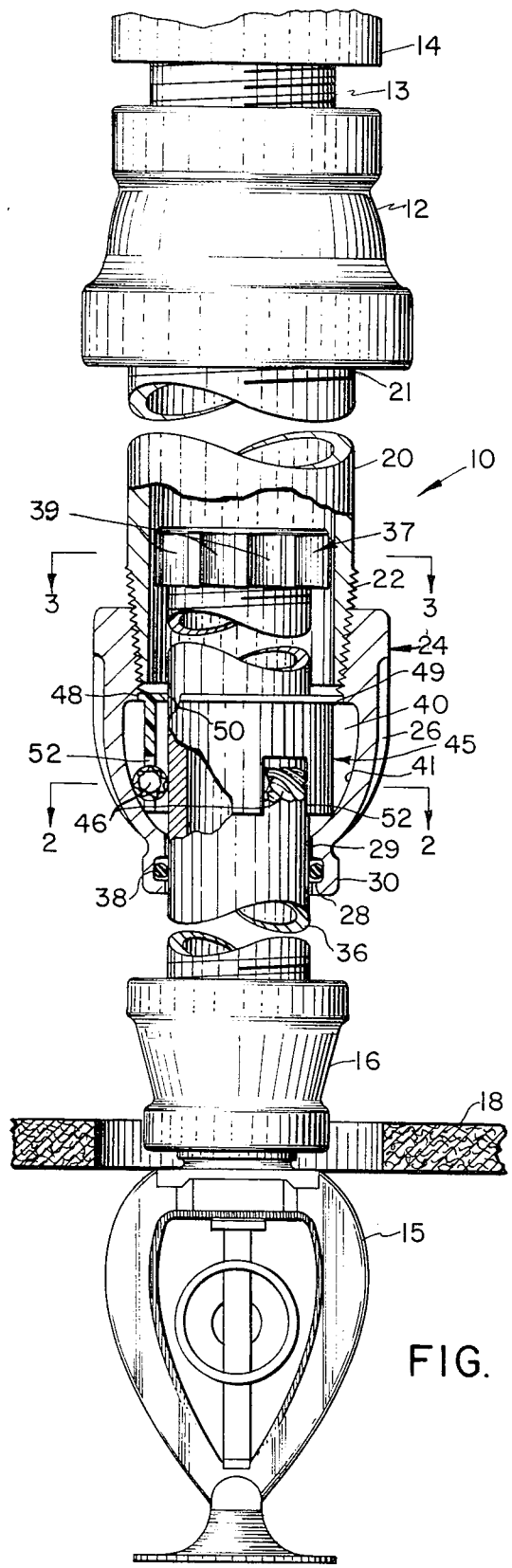
FIG. 1 is a side elevation view, broken and in partial section, showing an adjustable drop nipple according to the present invention.
Figure 2:
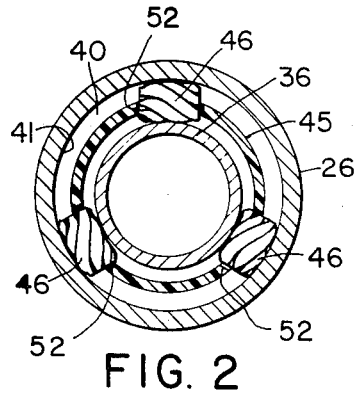
FIG. 2 is a sectional view taken along lines 2—2 in FIG. 1.
Figure 3:
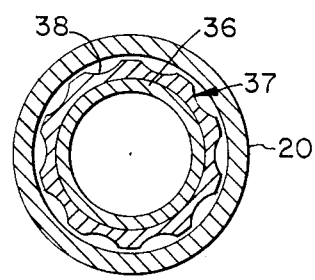
FIG. 3 is a sectional view taken along lines 3—3 in FIG. 1.

Referring first to FIG. 1, an adjustable nipple 10 embodying the preferred form of my invention is connected at one end, for example by suitable threads, to a standard pipe coupling 12, a standard pipe nipple 13 and a pipe fitting 14. The fitting 14 is part of the distribution piping for a standard fire sprinkler system. Only a portion of the fitting 14 for the distribution system for supplying fire extinguishing fluid to the nipple 10 is shown, as such fittings and systems are well known in the art without further illustration. A sprinkler 15 and a coupling 16 are connected to the other end of the nipple 10.

The adjustable nipple 10 is connected in pendent position from the fitting 14, with the sprinkler 15 extending below a drop ceiling 18 for the building in which the sprinkler system is installed.

The adjustable nipple 10 comprises a first pipe 20, a second pipe 36 and a reducer assembly 24. The first pipe 20 is threaded at one end 21 for connection to the coupling 12. The other end 22 of the first pipe 20 is threaded for connection to the larger, threaded opening of a reducer fitting member 26 of the reducer assembly 24.

The reducer fitting member 26 is provided with an annular groove 28 in the surface of the opening 29 in the smaller end 30, rather than with threads as would be provided for a standard reducer fitting. In all other respects, the reducer 26 is the same as a standard reducer fitting, including an annular curved surface 41 which is curved or converges inwardly as it extends from the larger opening of the reducer fitting member to the smaller opening 29; and the reducer fitting member 26 can be formed using a standard casting.

The second pipe 36 which is smaller than the first pipe 20, is passed through the reducer fitting body 26 and is telescoped into the second end 22 of the first pipe 20. The relative size of the first pipe 20 and the second pipe 36 is such that the second pipe fits easily into the first pipe, and the outer diameter of the pipe 36 is only slightly smaller than the opening 29 of the reducer 26.

The inner surface 41 of the reducer fitting member 26 cooperates with the outer circumferential surface of the pipe 36 to form an annular cavity 40 having a cross-sectional area which is reduced along an axial direction of the cavity toward the smaller opening end of the member 26.

Means preferably comprising a bushing 37 is threaded on the inner end of the second pipe 36 to prevent complete withdrawal of the second pipe 36 from the first pipe 20 and further to guide relative axial movement of the pipe 36 in the pipe 20. The outer circumferential surface of the bushing 37 has a clearance such as provided by relieved areas 39 to permit fluid passage around the bushing 37.

In order to seal against fluid flow between the opening 29 and the outer surface of the pipe 36, a sealing means, such as an O-ring 38, is positioned in the groove 28 and functions in a conventional manner to seal against the cylindrical, outer surface of the pipe 36. Thus, a fluid tight joint is provided between opening 29 and the outer surface of the inner pipe 36.

In accordance with the present invention, I have provided a novel means within the cavity 40 of the reducer 26 for restraining downward movement of the pipe 36, other than a spiral downward movement of said pipe 36, and for unrestrainedly permitting axial movement upwardly of the pipe 36 when the drop nipple 10 is connected to the sprinkler system with the sprinkler 15 in pendent position, thereby to adjustably select the length of the nipple 10.

The restraining and adjusting means comprise rollers 46, shown in detail in FIG. 8, which are formed of hardened steel and which have threads 60, such as type "U" drive screw threads, with preferably eight threads per revolution and with a helix angle of between 45°–60°, formed on the outer cylindrical surface of the rollers. The ends are tapered and the rollers have a length and a diameter which permits them to be positioned in the cavity 40 and to travel between a jammed position with the threads gripping the surface 41 of the cavity wall of the reducer 26 and the outer circumferential surface of the pipe 36, and an unjammed position with the rollers 46 in the wider area of the cavity 40.

The restraining and adjusting means further comprise a retainer 45 which is preferably formed of a plastic material and has a generally tubular shape. The upper edge of the retainer 45 is provided with a rim 48 having a radially outer surface 49 which engages the threaded opening of the large opening of the reducer coupling and having a radially inner surface 50 which fits snugly around the outer surface of the pipe 36. The axial length of the retainer 45 is selected so that the lower edge of the retainer will rest against the inner surface of the cavity 40.

Slots 52 are provided in the retainer 45 and extend axially upwardly from the lower edge of the retainer. The length and the width of the slots 52 are sufficiently greater than the length and diameter of the rollers 46 to permit the rollers 46 to fit loosely in the slots 52 with their axis oriented perpendicularly with respect to the axis of the nipple. The slots 52 extend axially of the retainer 45 to permit the rollers 46 to ride upwardly into the wider portion of the annular cavity 40. Preferably three slots 52 and three rollers 46 are provided, eaually spaced around the circumference of the retainer 45.

The operation of the adjustable drop nipple 10 will now be explained. With the nipple 10 connected in a pendent position from the sprinkler distribution piping, the rollers 46 will rest at the lower, narrower portion of the slots 52. The threads 60 grip both the outer durface of the pipe 36 and the surface 41 cavity 40. Because the cavity converges toward its smaller end, the rollers 46 grip the outer surface of the pipe 36 and restrain downward movement of the pipe along its axis. This retaining force increases as the hydraulic force within the sprinkler system acting against the adjustable nipple 10 and sprinkler system to effectively hold the nipple 10 in its adjusted position.

However, if a force is applied against the pipe 36 in an upward direction with the nipple 10 positioned in its pendent position, the rollers 46 will move upwardly within the slots 52 of the retainer 45 into a wider portion of the cavity 40 and rollers 46 will release their grip on the outer surface of the pipe 36. Thus, the pipe 36 may be moved upwardly with relatively little force to shorten the nipple 10 while the nipple is in an installed position.

In the event it is desired to lower the sprinkler 15, that is, to adjustably lengthen the nipple 10 while the nipple is in an installed position, the threads 60 will permit movement of the pipe 36 in a direction parallel to the spiral direction of the threads 60 with relatively little restraint. Thus, by rotating the pipe 36 in the direction of the threads 60, the pipe 36 will be lowered spirally on the threads 60. Upon reaching the desired lower position for the sprinkler 15, the rollers 46 will function to restrain axial movement of the pipe 36 in a downward direction, as explained above.

Figure 5:
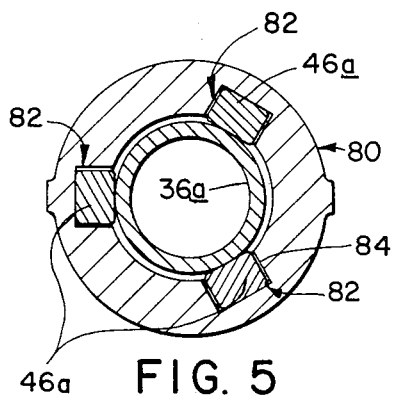
FIG. 5 is a sectional view taken along lines 5—5 in FIG. 4.
Figure 4:
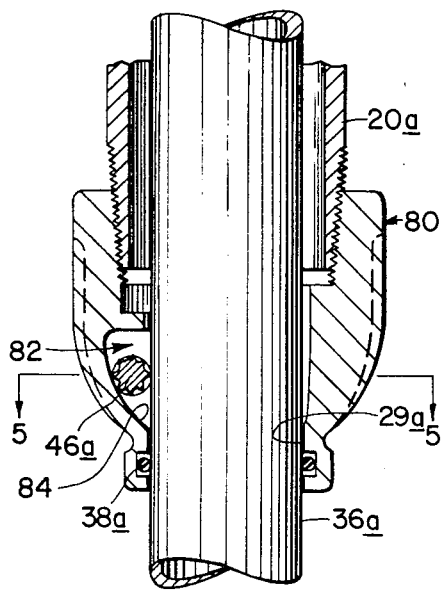
FIG. 4 is a fragmentary side elevation view in section showing a modification of the reducer fitting assembly of FIG. 1.
Figure 7:
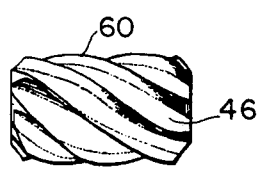
FIG. 7 is a side view of a roller shown in FIG. 1.

In FIGS. 4 and 5, I have shown a modification of the reducer assembly wherein a special reducer fitting 80 permits an elimination of the separate retainer for the rollers 46a. In this embodiment, special recesses 82 are formed in the body of the reducers 80 and three recesses 82 are shown as preferable, although another number of recesses might be used.

These special recesses 82 are formed in part by axially extending inner body surfaces 84 of the reducer fitting member. These surfaces are curved in a converging direction toward the smaller opening 29a of the fitting member and correspond to a portion of the inner axially extending surface 41 of a conventional reducer fitting. The width of the recesses 82 is slightly greater than the length of the rollers 46a and the rollers 46a are positioned in the recesses with their axes perpendicular to the axis of the nipple. The width of the recesses 82 is defined by thicker portions of the body wall or ribs adjacent to the edges of the recesses. These circumferentially spaced, thicker portions are formed during casting of the fitting member.

In operation, the reducer assembly with the special reducer fitting will function in the same manner in which the reducer assembly 24 functions. That is, the rollers 46a will restrain downward movement of the inner pipe by jamming between the reducer 80 and the pipe 36a in the recesses 82; but will permit spiral movement downwardly and will release to permit axial movement upwardly.

Figure 6:
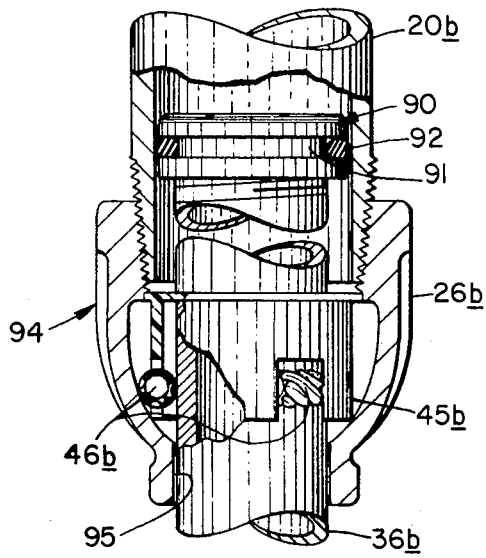
FIG. 6 is a sectional view of a portion of a nipple as shown in FIG. 1, but modified to show an alternate sealing arrangement between the telescoped pipes.

In FIG. 6, the O-ring 38 of FIG. 1 is eliminated and an alternative means is provided to obtain a fluid tight joint between the telescoped pipes 20b and 36b. In this modification, the bushing 90 is formed with an annular groove 91 in its outer circumferential surface to receive an O-ring 92. The O-ring 92 provides a fluid tight seal between the bushing 90 and the inner surface of the pipe 20b, while not limiting relative telescoping movement between the pipe 20b and 36b.

In this modification, the fluid seal is above the reducer fitting 94 and the fire extinguishing fluid from the sprinkler system is kept out of the fitting. The smaller opening 95 of the fitting 94 has sliding clearance with the outer surface of the pipe 36b and no seal is necessary at this location.

I Claim:

1. An adjustable drop nipple for connecting a fire sprinkler to a sprinkler distribution system with said sprinkler in a pendent position, comprising a first pipe having one end adapted for connection to said sprinkler distribution system, a second pipe having one end thereof telescoped into said first pipe having a second end adapted for connecting a sprinkler thereto, and means on the second end of said first pipe, operable when said drop nipple is connected to said distribution system with said sprinkler in a pendent position, for restraining movement of said second pipe in an axially downward direction other than along a predetermined spiral downward path, said restraining including means for releasing said second pipe for axial movement in an upward direction responsive automatically to a force in said upward direction on said second pipe.

2. An adjustable drop nipple as described in claim 1, wherein said restraining means comprises cylindrical means having spiral ridges on an outer surface thereof for gripping the outer surface of said second pipe upon axial downward movement of said second pipe.

3. An adjustable drop nipple as described in claim 2, wherein said cylindrical means comprise a plurality of rollers having spiral teeth on their outer surfaces.

4. An adjustable drop nipple as described in claim 3, wherein said restraining means further comprises a reducer fitting body member having an inner surface which forms with the outer surface of said second pipe an annular cavity of decreasing cross-sectional area in an axially downward direction, and said rollers are positioned in said cavity with their axes perpendicular to the axis of said drop nipple, whereby said rollers are jammed in the lower portion of said annular cavity and restrain axial downward movement of said second spiral teeth of said rollers and said rollers are loosely contained in the upper portion of said annular cavity upon upward movement of said second pipe.

5. An adjustable drop nipple as described in claim 3, wherein said restraining means further comprises retaining means for spacing said rollers around the outer surface of said second pipe.

6. An adjustable drop nipple as described in claim 3, wherein said spiral teeth of said roller have a uniform direction of curvature and a helix angle of between 45–60°.

7. An adjustable drop nipple as described in claim 3, wherein said restraining means further comprise a body member having recesses which are spaced around the inner surface thereof, the recesses having a curved surface which curves radially inwardly toward the axis of said second pipe in an axially downward direction of said recesses, and said rollers are positioned in said recesses with their axes perpendicular to the axis of said drop nipple, whereby said rollers are jammed in the lower portion of said recesses between said curved surface and said outer surface of said second pipe and restrain axial movement downwardly of said second pipe other than a predetermined spiral downward movement on said spiral teeth of said rollers, and said rollers are loosely contained in said recesses upon upward movement.

8. An adjustable drop nipple for connecting a fire sprinkler to a sprinkler distribution system with said sprinkler in a pendent position, comprising a first pipe having one end adapted for connection to said sprinkler distribution system, a second pipe having one end thereof telescoped into said first pipe from a second end of said first pipe, said second pipe having a second end adapted for connecting a sprinkler thereto, and restraining means on the second end of said first pipe, said restraining means including cylindrical means having spiral ridges on an outer surface thereof for gripping the outer surface of said second pipe responsive to an axial force in a downward direction on said second pipe for restraining movement of said second pipe in an axially downward direction when said drop nipple is connected to said distribution system with said sprinkler in a pendent position, and said restraining means including means for releasing said second pipe for axial movement in an upward direction responsive automatically to a force in said upward direction on said second pipe.

9. An adjustable drop nipple as described in claim 8, wherein said cylindrical means comprise a plurality of rollers having spiral teeth on their outer surfaces.

10. An adjustable drop nipple as described in claim 9, wherein said restraining means further comprises a reducer fitting body member having an inner surface which forms with the outer surface of said second pipe an annular cavity of decreasing cross-sectional area in an axially downward direction, and said rollers are positioned in said cavity with their axes perpendicular to the axis of said drop nipple, whereby said rollers are jammed in the lower portion of said annular cavity upon axial downward movement of said second pipe and are loosely contained in the upper portion of said annular cavity upon upward movement of said second pipe.

11. An adjustable drop nipple as described in claim 10, wherein said restraining means further comprises means for spacing said rollers in said cavity around the outer surface of said second pipe.

12. An adjustable drop nipple as described in claim 9, wherein said restraining means further comprises a body member having recesses which are spaced around the inner surface thereof, the recesses having a curved surface which curves radially inwardly toward the axis of said second pipe in an axially downward direction of said recesses, and said rollers are positioned in said recesses with their axes perpendicular to the axis of said drop nipple, whereby said rollers are jammed in the lower portion of said recesses between said curved surface and said outer surface of said second pipe and restrain axial movement downwardly of said second pipe, and said rollers are loosely contained in said recesses upon upward movement of said second pipe.

13. An adjustable drop nipple as described in claim 11, wherein said restraining means is generally tubular and has slots which receive said rollers, said slots being spaced to position said rollers around the cylindrical surface of said second pipe, and have an axial depth which permits a limited axial movement of said rollers, thereby to permit said rollers to move upwardly out of jamming engagement with said second pipe.

14. An adjustable drop nipple as described in claim 10, wherein the reducer fitting body member defines an annular groove in a lower body opening thereof, and an O-ring is positioned in said groove and sealingly engages the outer surface of said second pipe for forming a fluid seal therebetween.

15. An adjustable drop nipple for connecting a fire sprinkler to a sprinkler distribution system with said sprinkler in a pendent position, comprising a first pipe having one end adapted for connection to said sprinkler distribution system, a second pipe having one end thereof telescoped into said first pipe from a second end of said first pipe, said second pipe having a second end adapted for connecting a sprinkler thereto, and restraining means operable when said drop nipple is connected to said distribution system with said sprinkler in a pendent position for restraining movement of said second pipe axially thereof in a downward direction other than along a predetermined spiral downward path, said restraining means including cylindrical means having spiral ridges on an outer surface thereof for gripping the outer surface of said second pipe upon axial downward movement of said second pipe.

16. An adjustable drop nipple as described in claim 15, wherein said cylindrical means comprises a plurality of rollers having spiral teeth on their outer surfaces.

17. An adjustable drop nipple as described in claim 16, wherein said drop nipple further comprises means for effecting a fluid seal between said first pipe and said second pipe.

18. An adjustable drop nipple as described in claim 17, wherein seal means includes a bushing on said one end of said second pipe, said bushing defining an annular groove in an outer cylindrical surface thereof, and an O-ring is positioned in said groove and sealingly engages the inner surface of said first pipe.

19. An adjustable drop nipple as described in claim 16, wherein said restraining means further comprises a reducer fitting body member having an inner surface which forms with the outer surface of said second pipe an annular cavity of decreasing cross-sectional area in an axially downward direction, and said rollers are positioned in said cavity with their axes perpendicular to the axis of said drop nipple, whereby said rollers are jammed in the lower portion of said annular cavity upon axial downward movement of said second pipe other than spiral movement downwardly on said spiral teeth of said rollers.

20. An adjustable drop nipple as described in claim 19, wherein said restraining means further comprises retaining means for spacing said rollers around the outer surface of said second pipe.

21. An adjustable drop nipple as described in claim 19, wherein said spiral teeth of said rollers have a uniform direction of curvature and a helix angle of between 45–60°.

* * * * *